US010945003B2

United States Patent
Rahman (10) Patent No.: US 10,945,003 B2
(45) Date of Patent: Mar. 9, 2021

(54) DYNAMIC CONTENT MAPPING SYSTEMS AND METHODS

(71) Applicant: Intertrust Technologies Corporation, Sunnyvale, CA (US)

(72) Inventor: Steven Rahman, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 101 days.

(21) Appl. No.: 16/141,479

(22) Filed: Sep. 25, 2018

(65) Prior Publication Data

US 2019/0098345 A1 Mar. 28, 2019

Related U.S. Application Data

(60) Provisional application No. 62/563,929, filed on Sep. 27, 2017.

(51) Int. Cl.
| | |
|---|---|
| *H04N 21/234* | (2011.01) |
| *H04N 21/845* | (2011.01) |
| *H04N 21/81* | (2011.01) |
| *H04N 21/233* | (2011.01) |
| *H04N 21/262* | (2011.01) |
| *H04N 21/2668* | (2011.01) |

(Continued)

(52) U.S. Cl.
CPC ..... *H04N 21/23424* (2013.01); *H04N 21/233* (2013.01); *H04N 21/23418* (2013.01); *H04N 21/25883* (2013.01); *H04N 21/25891* (2013.01); *H04N 21/2668* (2013.01); *H04N 21/26233* (2013.01); *H04N 21/44213* (2013.01); *H04N 21/812* (2013.01); *H04N 21/8456* (2013.01)

(58) Field of Classification Search
CPC ....... H04N 21/23424; H04N 21/44213; H04N 21/25891; H04N 21/25883; H04N 21/8456; H04N 21/812; H04N 21/233; H04N 21/26233; H04N 21/23418; H04N 21/2668
See application file for complete search history.

(56) References Cited

U.S. PATENT DOCUMENTS

| | | |
|---|---|---|
| 6,505,169 B1 | 1/2003 | Bhagavath et al. |
| 6,698,020 B1 | 2/2004 | Zigmond et al. |

(Continued)

OTHER PUBLICATIONS

Madhok et al, "Semantic Understanding for Contextual In-Video Advertising," Association for the Advancement of Artificial Intelligence, 2018, 2 pages.

(Continued)

*Primary Examiner* — Kunal Langhnoja
(74) *Attorney, Agent, or Firm* — Finnegan, Henderson, Farabow, Garrett & Dunner, LLP (57) ABSTRACT

This disclosure relates to systems and methods for dynamically mapping content based on information relating to a user. In various embodiments, a segment associated with a user may be identified, and a content service may map the presentation of advertisements and/or other content within rendered content in a manner that is tailored to the identified segment. In this manner, advertisement and/or other content impressions may be targeted to the user based on their identified segment. Further embodiments facilitate defining and refining content maps for a particular segment until a content mapping meeting certain objective criteria is realized.

14 Claims, 7 Drawing Sheets

(51) Int. Cl.
  *H04N 21/442* (2011.01)
  *H04N 21/258* (2011.01)

(56) References Cited

U.S. PATENT DOCUMENTS

| | | |
|---|---|---|
| 8,060,904 B1 | 11/2011 | Evans et al. |
| 8,719,865 B2 | 5/2014 | Moonka et al. |
| 8,990,849 B2 | 3/2015 | Brueck et al. |
| 9,010,636 B2 | 4/2015 | Dmitriev et al. |
| 9,047,609 B2 | 6/2015 | Ellis et al. |
| 9,154,852 B2 | 10/2015 | Huber et al. |
| 2006/0242016 A1 | 10/2006 | Chenard |
| 2009/0013347 A1 | 1/2009 | Ahanger et al. |
| 2012/0158502 A1 | 6/2012 | Chung et al. |
| 2012/0185895 A1* | 7/2012 | Wong ............... H04N 21/26258 725/32 |
| 2015/0172737 A1* | 6/2015 | Lechner ............... H04N 21/812 725/32 |
| 2016/0050465 A1 | 2/2016 | Zaheer et al. |
| 2020/0029128 A1* | 1/2020 | Erskine ............... H04N 21/812 |

OTHER PUBLICATIONS

McCarthy, John, "Channel 4 trials AI that identifies TV scenes it can pair with contextual ads " The Drum, dated Jul. 4, 2018, available at: https://www.thedrum.com/news/2018/07/04channel-4-trials-ai-identifies-tv-scenes-it-an-pair-with-contextual-ads as of Oct. 31, 2019, 6 pages.

Singh, Pooja, "*How this Adtech Firm uses AI to Ensure Audience sees Relevant In-Video Ads*," dated Jan. 31, 2019, available at https://entrepreneur.com/article/327285 as of Oct. 31, 2019, 8 pages.

"Video AI—Video Content Analysis," Cloud Video Intelligence API, Google Cloud, downloaded from http://cloud.google.com/video-intelligence on Oct. 31, 2019, 12 pages.

\* cited by examiner

DYNAMIC CONTENT MAPPING SYSTEMS AND METHODS

RELATED AUTHORIZATION

This application claims the benefit of priority under 35 U.S.C. § 119(e) to U.S. Provisional Patent Application No. 62/563,929, filed Sep. 27, 2017, and entitled "DYNAMIC CONTENT MAPPING SYSTEMS AND METHODS," the contents of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for mapping content based on information relating to a user. More specifically, the present disclosure relates to systems and methods for dynamically mapping content for advertisement presentation based on information associated with a user.

Content is increasingly being consumed by users using a variety of personal electronic devices including, for example, smartphones, tablets, laptop computers, streaming media devices, TVs and/or the like. With the proliferation of content consumption using personal electronic devices, opportunities to monetize content consumption and/or otherwise compensate content creators and/or distributors are becoming increasingly important.

In certain circumstances, content may not necessarily be created in a manner that considers how advertisements rendered during playback may impact the viewing experience. For example, mid-roll advertisements may disrupt the storytelling narrative and emotional experience of a user viewing content originally generated for an advertisement free consumption platform. Different users may also be more amenable to advertisements of different lengths and/or advertisements rendered at different times during content playback. For example, a first user may be more amenable and/or more likely to act on a short advertisement rendered at the start of content playback (e.g., a pre-roll advertisement break) than a second user, who may be more amenable and/or more likely to act on a longer advertisement rendered towards the end of content playback (e.g., a late mid-roll advertisement break).

Systems and methods disclosed herein relate to the dynamic mapping of content for advertisement presentation based on information associated with users. In various embodiments, information relating to users, including personal information, may be collected by a content service. In some embodiments, the information may comprise information collected from personal electronic devices associated with the user (e.g., sensor information, device and/or application usage information, content consumption information, and/or the like). It will be appreciated that information associated with a user can be also collected in a variety of other suitable ways and/or from a variety of sources in connection with the disclosed embodiments.

Various demographic and/or other information associated with a user may be identified and/or otherwise inferred based on the collected information. Identified and/or inferred demographic and/or other information associated with a user may be referred to herein as a segment associated with a user, and may articulate one or more likely characteristics associated with the user. For example, information associated with a particular segment may articulate information relating to user's gender, age, residence, employment and/or occupation, salary, interest, relationship status, and/or the like. It will be appreciated that a wide variety of demographic and/or other information associated with a user may be identified and/or inferred based on collected information associated with the user and/or included as part of associated segment information consistent with the disclosed embodiments.

Based on an identified segment associated with a user, the content service may map the presentation of advertisements in connection with rendered content in a manner that is tailored to the particular user. For example, the content service may determine that users associated with a particular segment are more amenable and/or more likely to act on advertisements rendered at certain times during content playback, advertisements of a certain type and/or length, advertisements of a certain frequency, and/or the like. Information describing where advertisements are rendered within content, how many advertisements are rendered, their frequency, and/or the duration of advertisements may be referred to as a content map, a content break map, and/or advertisement break map. A content map associated with the user's segment may be selected by the content service and used in connection with rendering content and associated advertisements. In this manner, advertisement impressions may be tailored to the particular user based on their identified segment, and the likelihood of the user acting on the advertisements may be improved.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

As users interact with personal electronic devices, including mobile electronic devices, the Internet, and other connected services (e.g., content services), various information relating to the users may be collected. In certain embodiments, such information may be directly provided by a user (e.g., as part of a device and/or service registration process). In further embodiments, information may be obtained by monitoring a user's interaction with devices and/or services (e.g., sensor information, usage information, etc.). Collected information may identify and/or otherwise infer a variety of information relating to a user. For example, information may be collected related to a user that may identify and/or be used to infer a user's gender, age, ethnicity, residence, place of employment and/or occupation, salary, content interests, relationship status, and/or the like. Various volunteered and/or collected information related to a user may, in certain instances, be generally referred to herein as user and/or device information and/or data.

Information relating to a user may be used in a variety of contexts. In certain embodiments, content (e.g., advertisements) may be efficiently targeted to a particular user based on collected user information. For example, the systems and methods described herein can be sed in connection with advertisement matching and/or advertisement targeting technologies such as those described in commonly assigned co-pending U.S. patent application Ser. No. 12/785,406, filed May 21, 2010 ("the '406 application"), which is incorporated herein by reference in its entirety.

Information relating to a user and/or an associated device may further be used in connection with various aspects of the disclosed embodiments to determine a manner and/or time that advertisements and/or other content are presented to a user. In certain embodiments, a content service and/or other service provider may, for example, identify a segment associated with a user based on collected user and/or device information and/or data and render advertisements in a content stream at times and/or for durations based on a content map associated with the identified segment. In this manner, advertisements may be rendered to a user in a targeted manner that increases the likelihood that a user will be interested in and/or otherwise act on an advertisement.

Content Mapping Architecture

Figure 1:
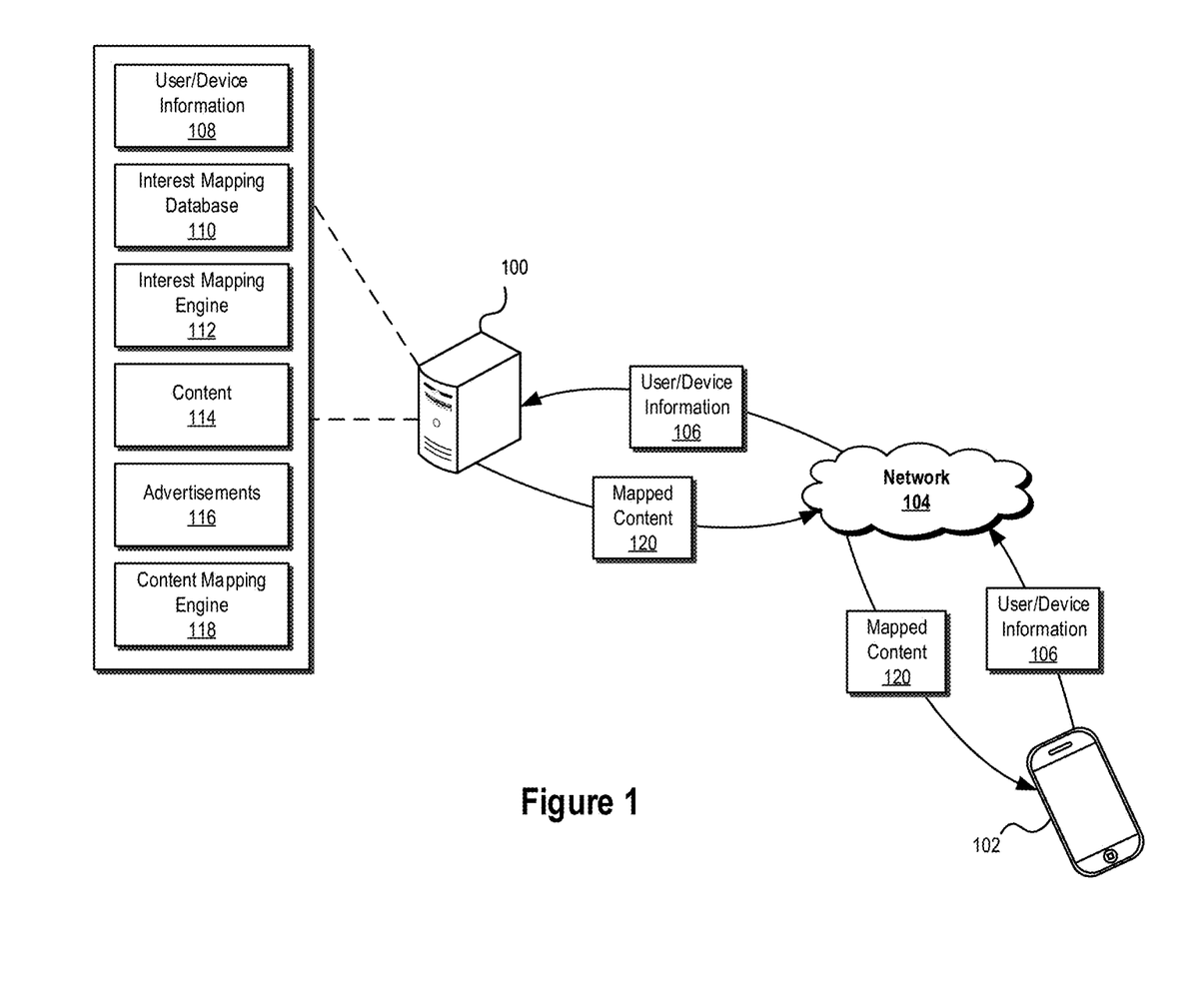
FIG. 1 illustrates an exemplary architecture for dynamically mapping content for advertisement presentation consistent with embodiments of the present disclosure.

FIG. 1 illustrates an exemplary architecture for dynamically mapping content for advertisement presentation consistent with embodiments of the present disclosure. As illustrated, the architecture may include a content service 100, which may comprise a trusted service, communicatively coupled with a user device 102, which may comprise a personal, mobile, laptop, desktop, set top, and/or any other type of electronic device associated with a user. The content service 100 may provide a variety of functions including, without limitation, distribution of content to user devices 102 (e.g., via content downloads, content streams, and/or the like), advertisement management and distribution services including targeted advertisement services, user information, interest, and/or segment inferencing based on collected information relating to the user, and/or dynamic mapping of content consistent with embodiments disclosed herein (e.g., mapping of content for advertisement presentation).

Although illustrated as a single system, it will be appreciated that various functions of the content service 100 described herein may be performed by any number of suitable systems in any suitable combination. For example, a first system may provide functions relating to the distribution of content to a user device 102, a second system may perform various user and/or device segment identification functions, and a third system may provide various advertisement management and distribution services, including dynamic content mapping services consistent with various aspects of the disclosed embodiments.

The content service 100, user device 102, and/or one or more other systems and/or services may be communicatively coupled using a variety of networks 104 and/or network connections. In certain embodiments, the network 104 may comprise a variety of network communication devices and/or channels and may utilize any suitable communications protocols and/or standards facilitating communication between the content service 100, user device 102, and/or one or more other systems and/or services. The network 104 may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 104 may incorporate one or more satellite communication links. In yet further embodiments, the network may utilize IEEE's 802.11 standards, Bluetooth®, ultra-wide band ("UWB"), Zigbee®, and or any other suitable standard or standards.

The content service 100, user device 102, and/or one or more other systems and/or services (e.g., a content mapping service) may comprise a variety of computing devices and/or systems, including any computing system or systems suitable to implement the systems and methods disclosed herein. The connected devices, services, and/or systems 100, 102, may comprise a variety of computing devices and systems, including laptop computer systems, desktop computer systems, server computer systems, distributed computer systems, smartphones and/or other mobile devices, tablet computers, and/or the like.

In certain embodiments, the content service 100, user device 102, and/or one or more other systems and/or services (e.g., a content mapping service) may comprise at least one processor system configured to execute instructions stored on an associated non-transitory computer-readable storage medium. As discussed in more detail below, the content service 100, user device 102, and/or one or more other systems and/or services may further comprise a secure processing unit ("SPU") configured to perform sensitive operations such as trusted credential and/or key management, user information management, secure policy management, and/or other aspects of the systems and methods disclosed herein. The content service 100, user device 102, and/or one or more other systems and/or services may further comprise software and/or hardware configured to enable electronic communication of information between the devices, services, and/or systems 100, 102 via the network 104 using any suitable communication technology and/or standard.

As a user interacts with the user device 102 and/or other devices and/or services (e.g., consumes content and/or interacts with applications and/or services), various information relating to the user may be obtained, which may in certain instances herein be generally referred to as user and/or device information and/or data. In certain embodiments, such information may be actively provided by a user of the device 102. For example, information may be directly provided and/or otherwise volunteered by a user when interacting with an application executing on the device 102, as part of a service and/or device registration process, and/or the like. In further embodiments, information relating to a user may be passively obtained by monitoring a user's activity with devices and/or services. For example, user location information, IP address information, content interest information, and/or the like may be obtained by monitoring a user's interaction with various applications executing on the device 102.

In some embodiments, the user device 102 may include a variety of sensor systems that may to provide a variety of information relating to a user. For example, the user device 102 may include, without limitation, one or more accelerometers, GPS sensors, acoustic sensors, infra-red sensors, imaging sensors, gyroscopes, proximity sensors, light sensors, magnetometers, cameras, wireless communication systems, and/or any other suitable system and/or sensors for detecting and/or measuring information associated with and/ or otherwise related to the user device 102, its surroundings, and/or a user of the device 102. Certain sensors of the user device 102 may comprise location-based sensors configured to generate location information relating to a location of the user device 102 and/or an associated user. Further sensors may be activity-based and/or other environmental-sensors configured to provide information relating to a usage of the user device 102 and/or an environment proximate to the device 102. In certain embodiments, the one or more sensors of the device 102 may measure contextual information that may be used to determine and/or infer certain location information relating to the user (e.g., interests, regularly visited points of interest, etc.). For example, if an accelerometer of a device indicates that the device 102 does not move on average between 11:00 PM and 6:00 AM every day, it may be inferred that the user typically sleeps between these hours and that a location of the device 102 during these hours likely corresponds to a user's home.

The user device 102 may transmit information 106 relating to the user and/or the device 102 to the content service 100 and/or another service (not shown). In certain embodiments, the content service 100 may provide certain functions associated with user information inferencing, user interest, demographic, and/or segment identification, and/or the like. For example, based on the received user and/or device information 106 and/or aggregated user and/or device information 108, the content service 100 may identify information relating to a user's likely gender, age, residence, employment and/or occupation, salary, relationship status, and/or the like, which may be associated with a particular user segment. In some embodiments, an interest mapping engine 112 executing on the content service 100 and/or another service may identify likely user interests and/or an associated user segment based, at least in part, on available user and/or device information 106, 108.

A variety of databases may be used in connection with various aspects of the 'disclosed embodiments. For example, information included in an interest mapping database 110 (e.g., a database storing an interest ontology, associations between user and/or device information and/or interests and/or segments, etc.) may be used by the interest mapping engine 112 to identify likely user interests based on available user and/or device information 106, 108. Similarly, a point of interest database, an IP address database (e.g., a database associating IP addresses with certain locations and/or areas such as, for example, a Maxmind database), and/or a demographics database associating particular demographic information and/or other segment information with locations and/or areas may be utilized in connection with various aspects of the disclosed embodiments. In some embodiments, such databases may be stored and/or otherwise be managed by the content service 100. In other embodiments, the databases may be accessed by the content service 100 from one or more third-party systems and/or services.

Based on identified user interests and/or segments, the content service 100 may select one or more advertisements 116 that are well-matched to the user. For example, the content service 100 may identify that a user is interested in outdoor recreation based on received user and/or device information 106, 108. Accordingly, the content service 100 may select one or more advertisements 116 for rendering to the user in connection with content 114 that are related to outdoor recreation products and/or services.

Consistent with various disclosed embodiments, the content service 100 may further map the presentation of advertisements 116 and/or other content in connection with content rendered on the device 102 based on segment information associated with the user that is identified based on user and/or device information 106, 108. In this manner, advertisements 116 and/or other content may be rendered at a time and/or in a manner that is tailored to a particular user. For example, the content service 100 may determine that users associated with a particular segment are more amenable and/or more likely to act on advertisements rendered at certain times during content playback, advertisements of certain type and/or length, advertisements of a certain frequency, and/or the like. In certain embodiments, content mapping may be performed, at least in part, by a content mapping engine 118 executing on the content service 100 and/or another associated service.

Information describing where advertisements and/or other content may be rendered within other content, how many advertisements and/or other content may be rendered within other content, the frequency that advertisements and/or content may be rendered within other content, a type of content and/or advertisement that may be rendered, and/or the length of content and/or advertisements that may be rendered may be articulated in an content map generated by the content service 100. In various instances herein, a content map may be also referred to as a content break map and/or an advertisement break map.

A content map may be used by the content service 100, the user device 102, and/or another service to facilitate rendering of content (e.g., advertisements) within the mapped content in a manner associated with the identified segment of the user. For example, the content map may be used by the content service 100 to render advertisements in connection with a mapped content stream 120. In further embodiments, the content map may be communicated to the user device 102 separate from and/or in combination with one or more advertisements and/or the associated mapped content, and a rendering application of the user device 102 may ensure that advertisements are presented in accordance with the content map when the associated content is rendered by the device 102.

It will be appreciated that a number of variations can be made to the architecture and relationships presented in connection with FIG. 1 within the scope of the inventive body of work. For example, without limitation, in some embodiments, some or all of the functions performed by the user device 102 may be performed by the content service 100 and/or one or more other services. Similarly, some or all of the functions performed by the content service 100 may be performed by the user device 102 and/or one or more other services. Thus, it will be appreciated that FIG. 1 is provided for purposes of illustration and explanation, and not limitation.

Content Maps

Figure 2:
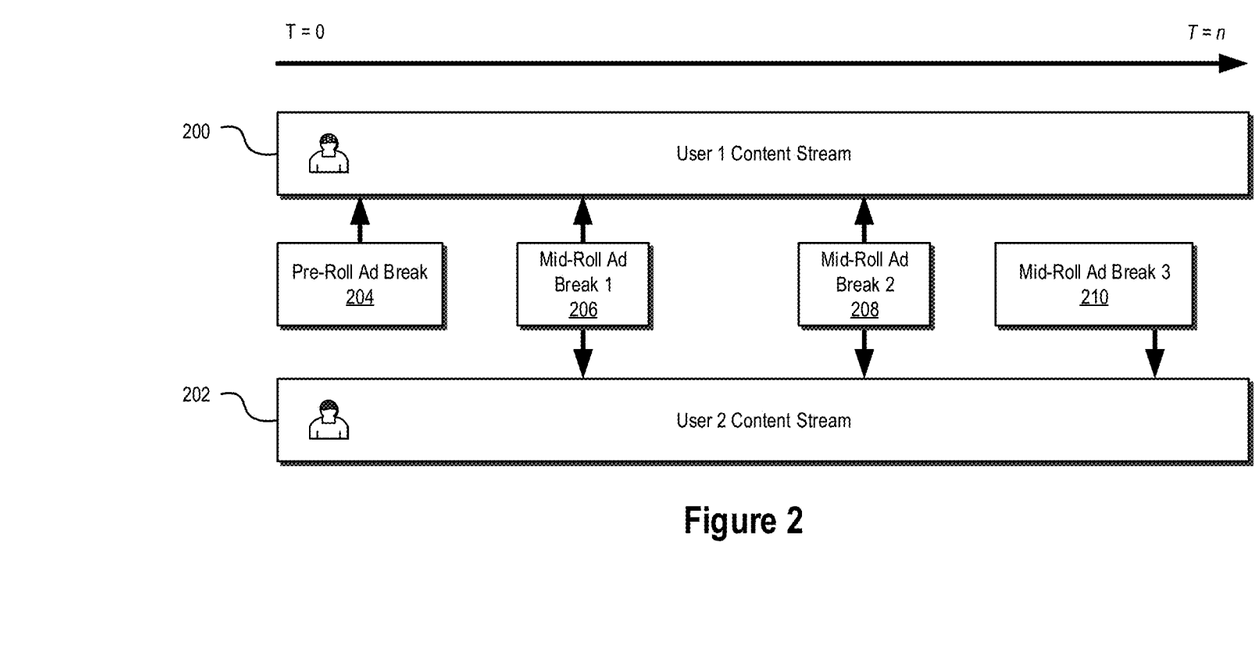
FIG. 2 illustrates an example of a content map for different segments consistent with embodiments of the present disclosure.

FIG. 2 illustrates an example of a content maps for different segments and/or users consistent with embodiments of the present disclosure. As discussed above, information describing where advertisements are rendered within content (e.g., a content stream), how many advertisements are rendered, their frequency, their duration, and/or their type (e.g., video, long form, short form, still image, audio, and/or the like) may be reflected in a content map associated with the content generated by a content service and/or another service (e.g., a content mapping service).

Different segments and, by extension, different users associated with the segments, may have different content maps associated with content. Using different content maps for different identified segments may allow for advertisements and/or other content to be rendered at a time and in a manner that is tailored to and/or otherwise optimized to achieve certain objectives for a particular user and/or segment. As discussed in more detail below, content maps may be associated with different identified segments according to a variety of suitable criteria. For example, a content map may be selected for a particular segment based on how well suited the content map is for achieving certain content monetization objectives (e.g., advertisement realization rates), content viewing and/or impression objectives (e.g., total number of views), user engagement objectives, user feedback objectives and/or the like.

In the illustrated example of content mapping, a first content stream 200 associated with a first user may be associated with a content map articulating a pre-roll advertisement break 204 earlier in the content stream (e.g., closer to T=0) and two mid-roll advertisement breaks 206, 208. A segment associated with a second user, however, may be less likely to act on a pre-roll advertisement break 204, but may be more inclined to act on a late mid-roll advertisement break 210. Accordingly, a second content stream 202 associated with the second user may be associated with a content map articulating two mid-roll advertisement breaks 206, 208 near the middle of the content stream and a final and longer mid-roll advertisement break towards the end of the content stream 210. In this manner, the number of advertisements, their frequency, and/or the duration of the advertisements may be tailored to the specific users based on their identified segments by using different content maps for each user.

In some embodiments, A/B and/or other group testing methods may be used to identify content maps to be used in connection with particular a segment of users. In some embodiments, the identified content maps may be associated with a particular piece of content for the segment. In other embodiments, the identified content maps may be independent of specific content, and may be used in connection with any content and/or content of a particular type (e.g., short television show, long television show, movie, etc.) for a particular segment.

In various embodiments, group testing may be used to determine when in a content stream, how frequent, and/or for how long users associated with a particular segment prefer to view presented advertisements and/or are otherwise more likely to act on presented advertisements (e.g., by completing a call to action and/or the like). Multiple content maps may be defined and refined and/or otherwise dynamically tested for a particular segment until an advertisement break map meeting certain defined criteria is realized. For example, different advertisement break maps may be defined and tested until an advertisement break map meets certain user feedback thresholds, advertisement realization rates (e.g., monetization thresholds/goals), and/or other optimization objectives.

In some embodiments, content breaks may further be determined based on how content rendered during playback impact a user's experience viewing content. For example, in certain circumstances, content may not necessarily be created in a manner that considers how advertisements rendered during playback may impact the storytelling narrative and emotional experience of a user viewing the content. Various techniques, including machine learning techniques, may be used to detect potential advertisement breaks within content that have minimal and/or less impact on content viewing. For example, content may be analyzed to determine when video and/or audio fades in and/or out, when video content changes scenes, characters, and/or locations, and/or the like and, based on such analysis, identify potential locations within the content for advertisement and/or other content breaks. In further embodiments, potential break locations may be identified based on markers (e.g., timestamps) defined by content creators and/or other entities.

Segment Generation and Identification

As described above, various demographic and/or other information associated with a group of similar users (e.g., gender, age, residence, employment and/or occupation, salary, interest, relationship status) may be referred to segment information. Segments may be identified by analyzing and/or drawing inferences from information associated with the user, which in some embodiments may comprise collected device information. In some embodiments, segments may be articulated by a marketing service, advertiser, and/or content provider, and user information may be mapped to the articulated segments to associate particular users with the segments. For example, a marketing service may be able to target a specific segment (e.g., the segment could be "Women Who Love the Animated Feature-Length Movies") and advertisement breaks could be inserted in the playback of content for the segment based a content map identified using various embodiments of the disclosed systems and methods.

Figure 3:
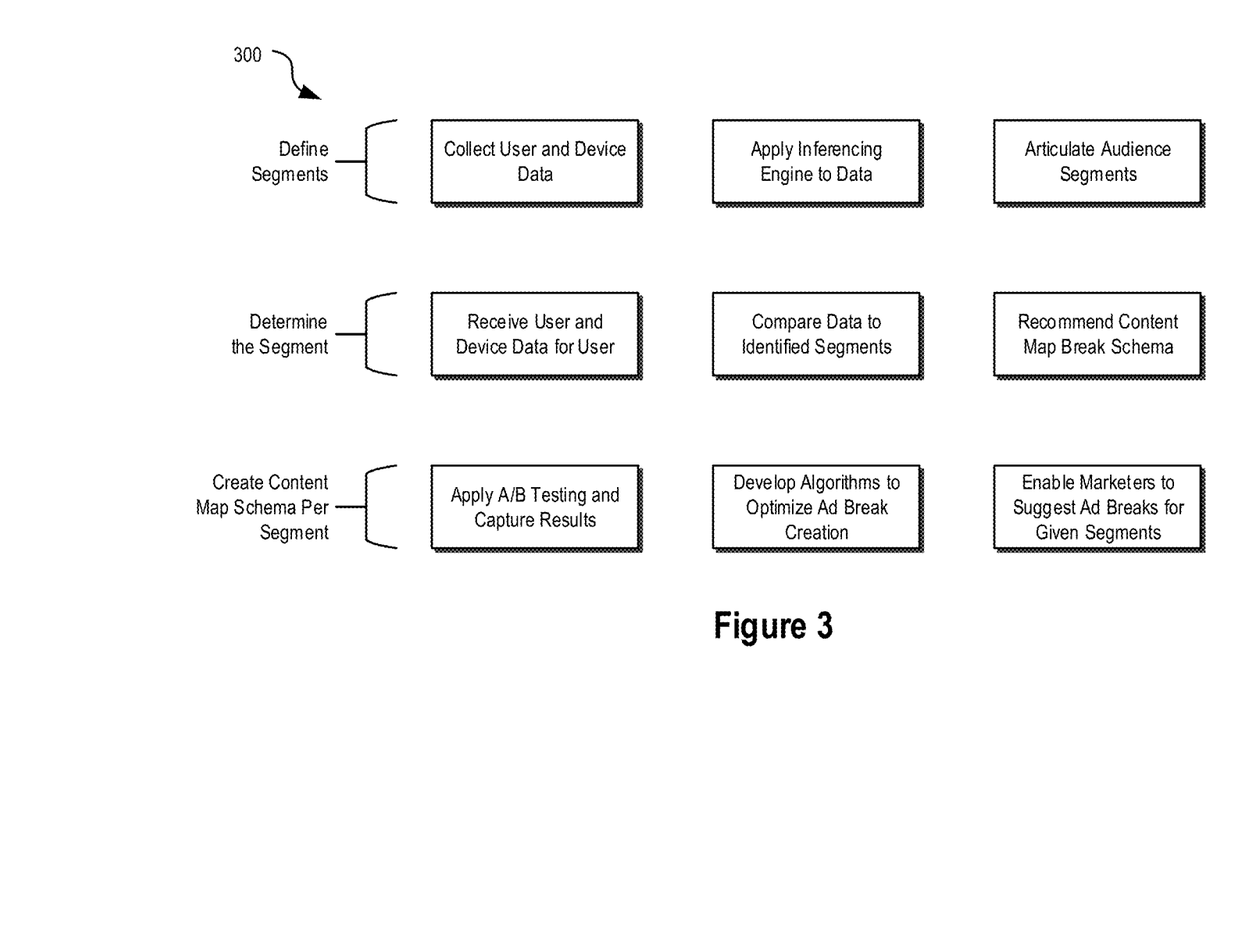
FIG. 3 illustrates a diagram of various aspects of dynamic content mapping consistent with embodiments of the present disclosure.

FIG. 3 illustrates a diagram 300 of various aspects of dynamic content mapping consistent with embodiments disclosed herein. As shown, segments associated with user may first be defined/articulated. In some embodiments, segments may be defined based on collected user and/or device data and/or known characteristics of a user (e.g., based on user-volunteered data and/or the like). Segments may further be defined based on inferences drawn from collected user and/or device data.

Segments associated with an individual user may be identified based on collected user and/or device data associated with the user. For example, collected user and/or device data may be compared with information associated with articulated segments to determine whether the user is associated with an articulated segment. In some embodiments, inferences may be drawn from collected user and/or device data to determine whether the user is associated with an articulated segment. A content map and/or schema associated with the identified segment may then be recommended and/or otherwise associated with the user for use when content and/or advertisements are rendered to the user.

As discussed above, segments may be associated with refined and/or tested content break maps. For example, group testing such as A/B testing may be used to determine when in a content stream, how frequent, and/or for how long users associated with a particular segment prefer to view presented advertisements and/or are otherwise more likely to act on presented advertisements. In certain embodiments, content break maps may further incorporate suitable advertisement locations identified by analyzing content to determine when advertisement breaks have minimal and/or less detrimental impact on content viewing (e.g., analysis using machine learning algorithms and/or the like). Marketing services and/or other interested parties may further define advertisement locations incorporated into content break maps for a given segment.

Content Map Generation

Figure 4:
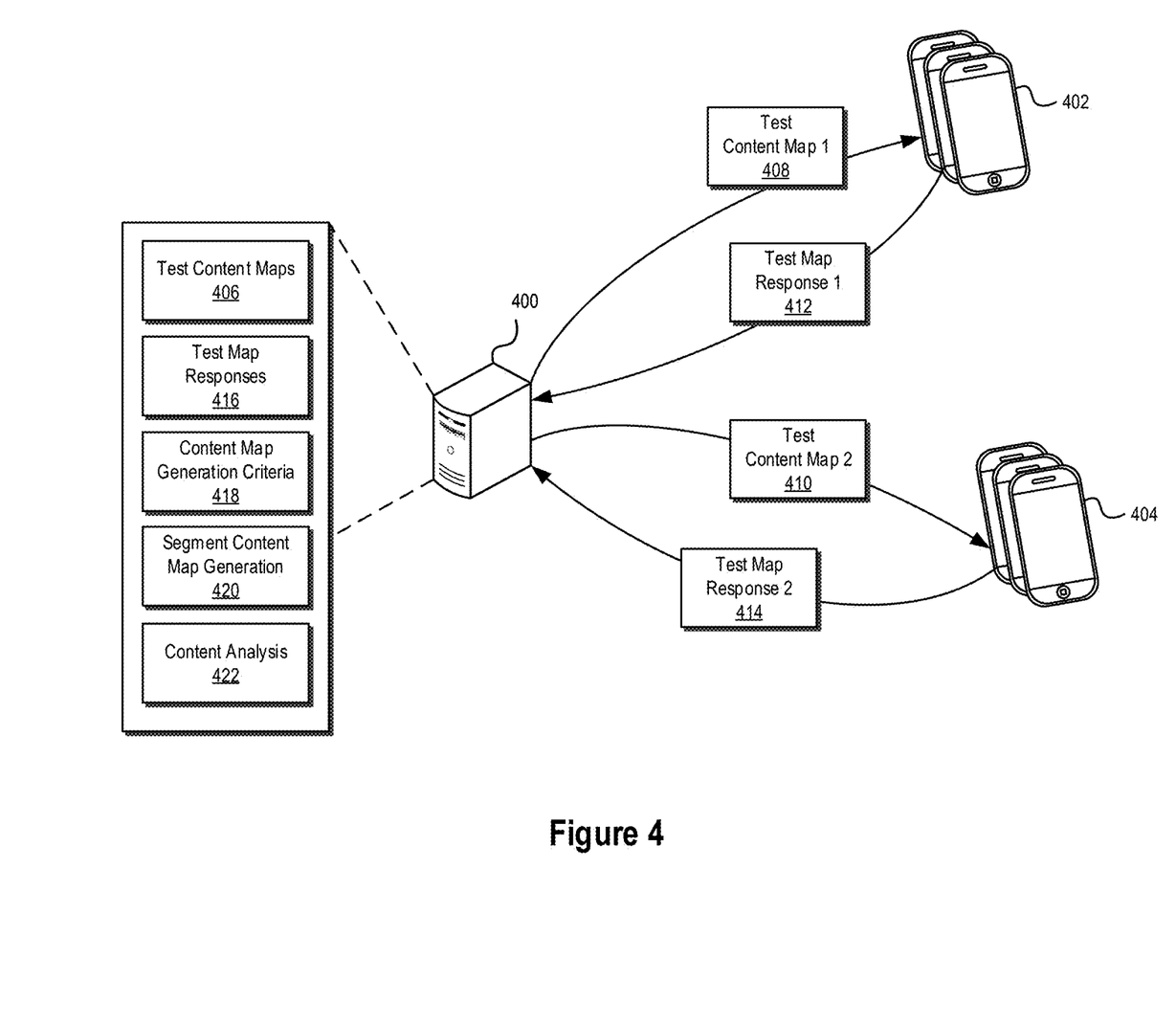
FIG. 4 illustrates an example of content map generation consistent with embodiments of the present disclosure.

FIG. 4 illustrates an example of content map generation consistent with embodiments of the present disclosure. As discussed above, various group testing methods may be used to generate a content map associated with a particular segment of users. For example, group testing methods may be implemented by a content mapping service 400 to determine for a given user segment where and/or when content and/or advertisements should be rendered within content (e.g., a content stream), how many pieces of content and/or advertisements should be rendered, the frequency, duration, and/or type of such rendered content and/or advertisements, and/or the like. Such information may be reflected in a content map associated with the user segment, and testing methods consistent with various disclosed embodiments may optimize and/or otherwise improve the efficacy of a particular content maps relative to one or more articulated objectives.

In certain embodiments, a content mapping service 400 may be configured to perform various functions relating to generating content maps for a given user segment. In certain embodiments, the content mapping service 400 may be separate from a content service that distributes content and/or content maps to devices for rendering and/or a segment identification service that may determine a segment associated with a user based on available user and/or device information. In further embodiments, the content mapping service 400 may be combined into a single system and/or service and/or any suitable combination of interacting systems and/or services providing various aspects of content distribution, segment identification, and/or other methods detailed herein.

One or more test content maps 406 may be generated by the content mapping service 400. In certain embodiments, the test content maps 406 may generated independent of any particular piece of associated content. For example, the generated test content maps 406 may be generated to include a number of different content breaks for advertisements and/or other content (e.g., breaks at different times, breaks of different durations, and/or the like) independent of any particular piece of associated content.

In further embodiments, the test content maps 406 may be generated independent of any particular piece of content, but may be associated with a particular content type. For example, test content maps 406 may be generated in consideration of traditional advertisement and/or content break locations and/or durations for a feature length film (e.g., pre-roll break, mid roll breaks, etc.). In another example, test content maps 406 may be generated in consideration of traditional advertisement and/or content break locations and/or durations for a 60-minute timeslot television show.

Test content maps 406 may be further generated in consideration of a particular piece of associated content. That is, a content map may be generated that is associated with and/or tailored to a specific piece of content. In some embodiments, breaks for advertisements and/or other content in an associated map may be determined based on how the rendering of advertisements and/or other content within content may impact a user's experience viewing the content. For example, content may not necessarily be created in a manner that considers how advertisements rendered during playback may impact the storytelling narrative and emotional experience of a user viewing the content. Therefore, identifying times and/or locations within content that are more amenable for advertisement and/or content breaks may improve a user's overall content viewing experience.

Consistent with various aspects of the disclosed embodiments, test content maps 406 may be generated by the content mapping service 400 by analyzing content to identify potential breaks within the content that have minimal and/or less impact on content viewing and/or are otherwise more amenable to a content break. For example, the content mapping service 400 and/or an associated content analysis module 422 executing thereon may be configured to analyze content to determine when video and/or audio in the content fades in and/or out, which may be indicative of natural narrative transitions within the content. Such transition points may be identified as a potential candidate content break locations and be reflected in generated test content maps 406. Similarly, potential content break locations may be identified based on analyzing content to determine when the content changes scenes, when new characters are introduced, when the content changes locations, and/or the like. A variety of suitable methods may be used to analyze content to identify candidate content break locations, including methods that implement, without limitation, machine learning techniques, automatic content recognition ("ACR") techniques, and/or the like.

In further embodiments, potential content break locations may be identified by the content mapping service 400 and/or the content analysis module 422 based on metadata and/or markers (e.g., timestamps) associated with content. For example, content creators and/or other entities may identify candidate content break locations and include and/or otherwise associate metadata and markers with content indicative of the time and/or location of the candidate break locations. In some embodiments, a content provider and/or other entity may provide multiple alternative metadata and/or markers (e.g., timestamps) associated with a particular piece of content reflecting different candidate content break locations. In other embodiments, a content provider and/or other entity may provide metadata and/or markers associated with a particular piece of content that identifies a relatively larger number of candidate content break locations, and the content mapping service 400 and/or content analysis module 422 may generate test content maps 406 using a subset of the identified candidate content break locations.

Consistent with various embodiments, test content maps 406 may describe, without limitation, locations and/or times where advertisements and/or other content may be rendered within content (e.g., a content stream), how many advertisements and/or other content may be rendered, their frequency, their duration, and/or their type (e.g., video, long form, short form, still image, audio, etc.) and/or the like. It will be appreciated that test content maps 406 may be generated in a variety of ways using a variety of methods, and that any suitable method and/or combination of methods may be used to identify potential content break locations and/or generate test content maps 406 in connection with various aspects of the disclosed embodiments.

Groups of user devices 402, 404 having users associated with a particular segment may be identified by the content mapping service 400 and/or another associated service. Different candidate test content maps 408, 410 from the generated test content maps 406 may be communicated by the content mapping service 400 and/or another associated service to the user devices 402, 404 and/or a content service (not shown). The devices 402, 404 may render content and advertisements and/or other content in accordance with the candidate test content maps 408, 410, and return to the content mapping service 400 response information 412, 414 associated with the candidate test content maps 408, 410. In certain embodiments, the response information 412, 414 may comprise an indication of realization rates, user interaction, user feedback, and/or any other measure of user engagement with advertisements and/or other content presented in accordance with the candidate test content maps 408, 410. In some embodiments, received rest map response information may be aggregated 416 by the content mapping service 400.

The content mapping service 400 and/or a segment content map generation module 420 executing thereon may compare the content test map response information 412, 414 against content map generation criteria 418 to select one or more content test maps 408, 410 to use in connection with the particular segment associated with the user devices 402, 404. For example, a test content map may be selected from the tested content maps 408, 410 based on its associated response information (412 or 414) meeting certain user feedback thresholds, advertisement realization rates, advertisement monetarization thresholds and/or goals, and/or the like articulated in the content map generation criteria 418.

In at least one example, the first and second groups of devices 402, 404 may be identified by the content mapping service 400 and/or another associated service as being associated with a segment that comprises females aged 35-40 years old. The content mapping service 400 may communicate a first content test map 408 to the first group of devices 402 for use in connection with rendering content, and may further communicate a second content test map 410 that is different from the first content test map 408 (at least in part) to the second group of devices 404 for use in connection with rendering content.

The first group of devices 402 may render advertisements and/or other content in accordance with the first content test map 408 and communicate to the content mapping service 400 first test map response information 412 indicative of user engagement with the rendered advertisements and/or other content. Similarly, the second group of devices 404 may render advertisements and/or other content in accordance with the second content test map 410 and communicate to the content mapping service 400 second test map response information 414.

The content mapping service 400 and/or a segment content map generation module 420 executing thereon may compare the received first test map response information 412 and second test map response information 414 against content map generation criteria 418 to determine which associated content test map 408, 410 best achieves certain objectives reflected by the criteria 418. For example, the segment content map generation module 420 may determine that the first test map response information 412 better meets objectives defined by the content map generation criteria, and thus may associate the first test content map 408 with the segment that comprises females aged 35-40 years old for future use in connection with rendering content on user devices associated with this segment.

It will be appreciated that a number of variations can be made to the architecture and relationships presented in connection with FIG. 4 within the scope of the inventive body of work. For example, without limitation, in some embodiments, some or all of the functions performed by the content mapping service 400 may be performed by one or more other systems and/or service. Although two candidate test content maps 408, 410 and two groups of user devices 402, 404 are illustrated in connection with FIG. 4, it will be appreciated that any suitable number of test content maps 408, 410 and or user device groups 402, 404 may be used in connection with various aspects of content mapping consistent with the disclosed embodiments. Thus, it will be appreciated that FIG. 4 is provided for purposes of illustration and explanation, and not limitation.

Figure 5:
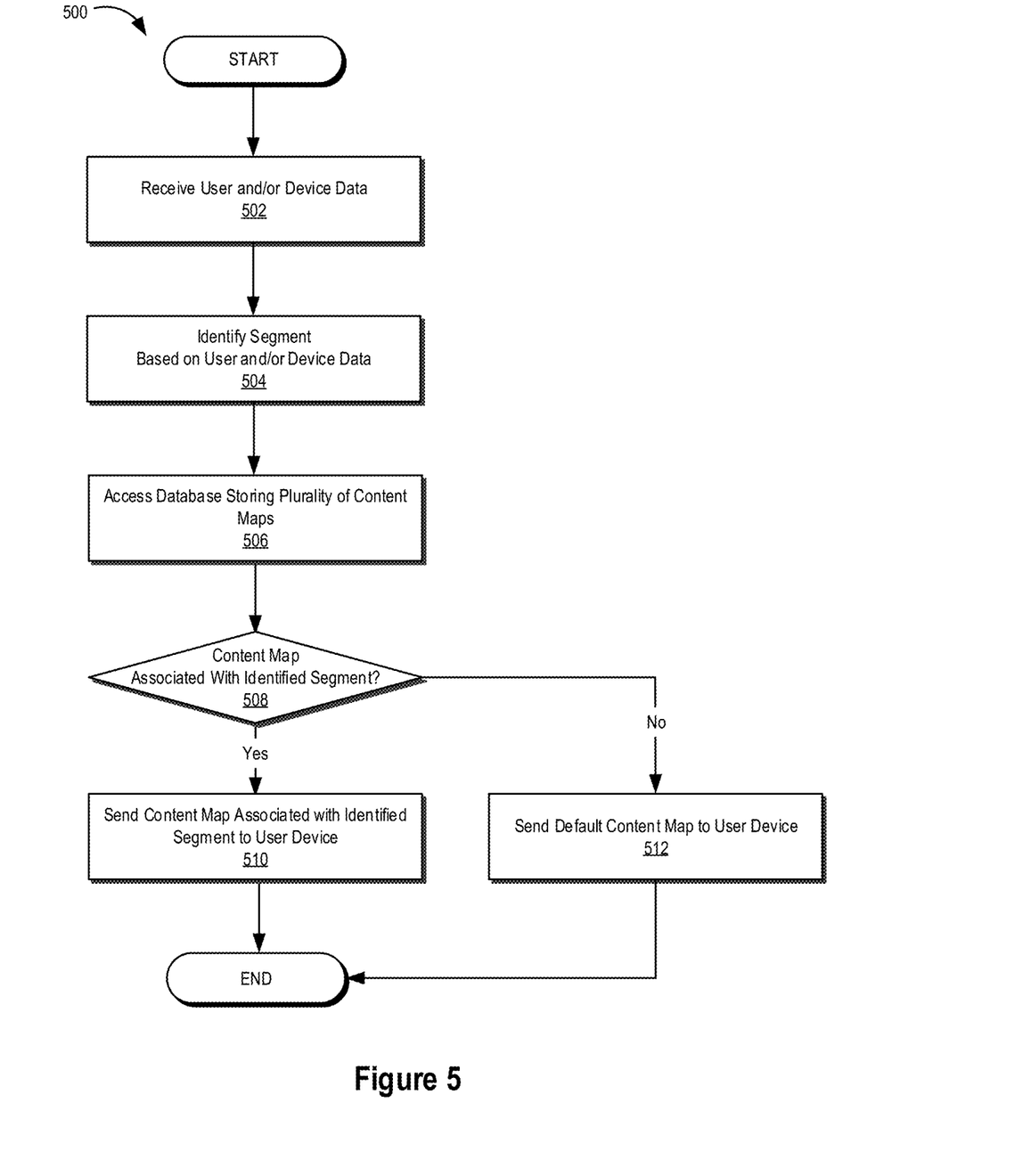
FIG. 5 illustrates a flow chart of an example of a method for dynamically mapping content for advertisement presentation consistent with embodiments of the present disclosure.

FIG. 5 illustrates a flow chart of an example of a method 500 for dynamically mapping content for advertisement presentation consistent with embodiments of the present disclosure. The illustrated method 500 may be implemented in a variety of ways, including using software, firmware, hardware, and/or any combination hereof. In certain embodiments, the illustrated method 500 may facilitate the rendering of advertisements and/or other content within content in a manner that is tailored to a particular user and/or an associated segment.

At 502, user and/or device data may be received from a device associated with a user (e.g., received by a content service and/or other service). The user and/or device data may comprise various information including, without limitation, information directly provided by a user and/or information obtained by monitoring a user's interaction with devices and/or services (e.g., sensor information, usage information, and/or the like).

Collected user and/or device data may identifying and/or otherwise infer a variety of information relating to a user. At 504, a segment associated with the user may be identified based on the received user and/or device data. The segment may articulate a variety of information and/or characteristics associated with the user including, for example, one or more of a user's gender, age, residence, employment and/or occupation, salary, interest, relationship status, and/or the like. In certain embodiments, the segment may be identified by comparing the received user and/or device data with a database associating user and/or device information with a plurality of segments.

At 506, a database storing a plurality of content maps may be accessed. In certain embodiments, the plurality of content maps may be stored in a database maintained by the content service. In further embodiments, the plurality of content maps and/or an associated database may be accessed and/or otherwise retrieved from a remote system.

At 508, it may be determined whether the database includes a content map associated with the segment identified as being associated with the user. In some embodiments, it may be further determined whether the database includes a content map associated with an item of content that the user wishes to render on their user device.

If no content map associated with the user segment is included in the database, the method 500 may proceed to 512, where a default content map may be sent to the user device and/or used in connection with rendering content to the device (e.g., used in generating a video and/or audio content stream and/or the like). Advertisements and/or other content, which may include video content, audio content, text content, image content, and/or the like, may be rendered within the content by the user device at one or more content break locations articulated by the default content map.

If a content map associated with the user segment is included in the database, the method 500 may proceed to 510. At 510, the content map associated with the identified user segment may be sent to the user device and/or used in connection with rendering content to the device (e.g., used in generating a video and/or audio content stream and/or the like). Advertisements and/or other content, which may include video content, audio content, text content, image content, and/or the like, may be rendered within the content by the user device at one or more content break locations articulated by the identified content map.

Figure 6:
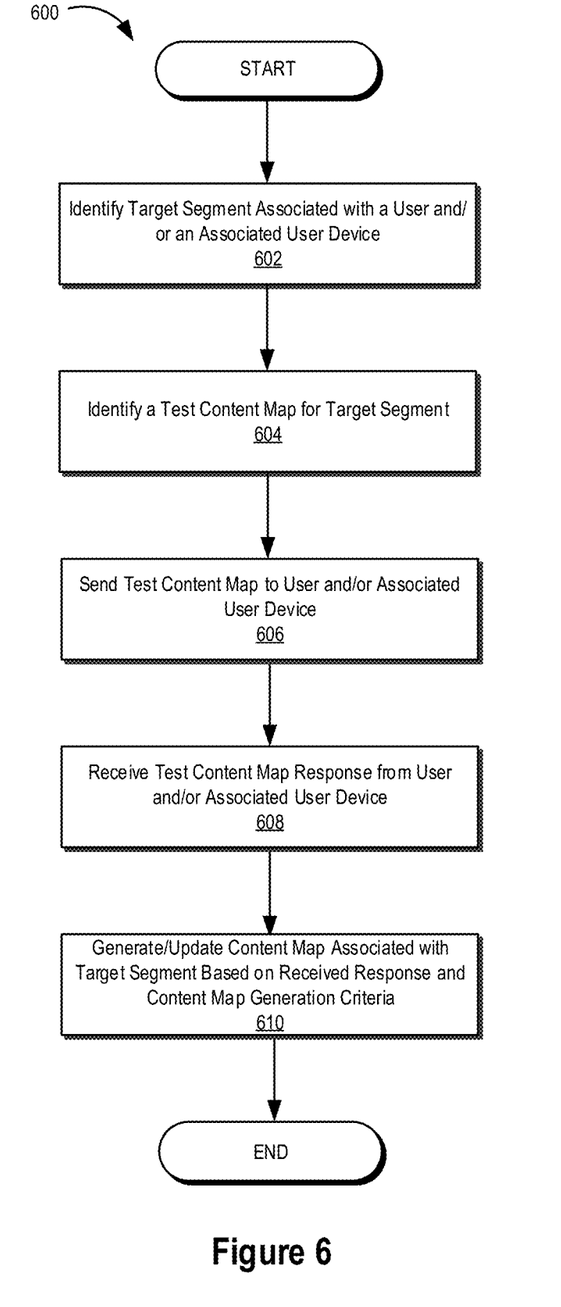
FIG. 6 illustrates a flow chart of an example of a method for generating a content map consistent with embodiments of the present disclosure.

FIG. 6 illustrates a flow chart of an example of a method 600 for generating a content map consistent with embodiments of the present disclosure. The illustrated method 600 may be implemented in a variety of ways, including using software, firmware, hardware, and/or any combination hereof. In certain embodiments, the illustrated method 600 may be used to generate a content map associated with a particular user segment.

At 602, a target segment associated with a user and/or an associated device may be identified. At 604, a test content map may be generated and/or otherwise identified. In certain embodiments, the test content map may be associated with a particular piece of content. In other embodiments, the test content map may be independent of any particular piece of associated content.

Content may be analyzed to generate the test content map. For example, content may be analyzed to determine when video and/or audio fades in and/or out, when video content changes scenes, characters, and/or locations, and/or the like. Based on such analysis, identify potential locations within the content for content breaks may be identified and reflected in the test content map. In further embodiments, potential break locations within the content may be identified based on markers (e.g., timestamps) defined by content creators and/or other entities and be reflected in generated content maps.

At 606, the identified test content map may be sent to the user device identified as being associated with the target segment and/or used in connection with rendering content to the device (e.g., used generating a video and/or audio content stream sent to the device and/or the like). A response may be received from the user device at 608. The response may comprise an indication of realization rates, user interaction, user feedback, and/or any other measure of user engagement with advertisements and/or other content presented in accordance with the test content map.

A content map associated with the target segment may be updated and/or otherwise generated at 610 based on the received response and content map generation criteria. For example, based on the response received at 608, it may be determined that the test content map meets objectives defined by content map generation criteria. Based on this determination, the test content map may be used as and/or used to update a content map associated with the target segment.

Figure 7:
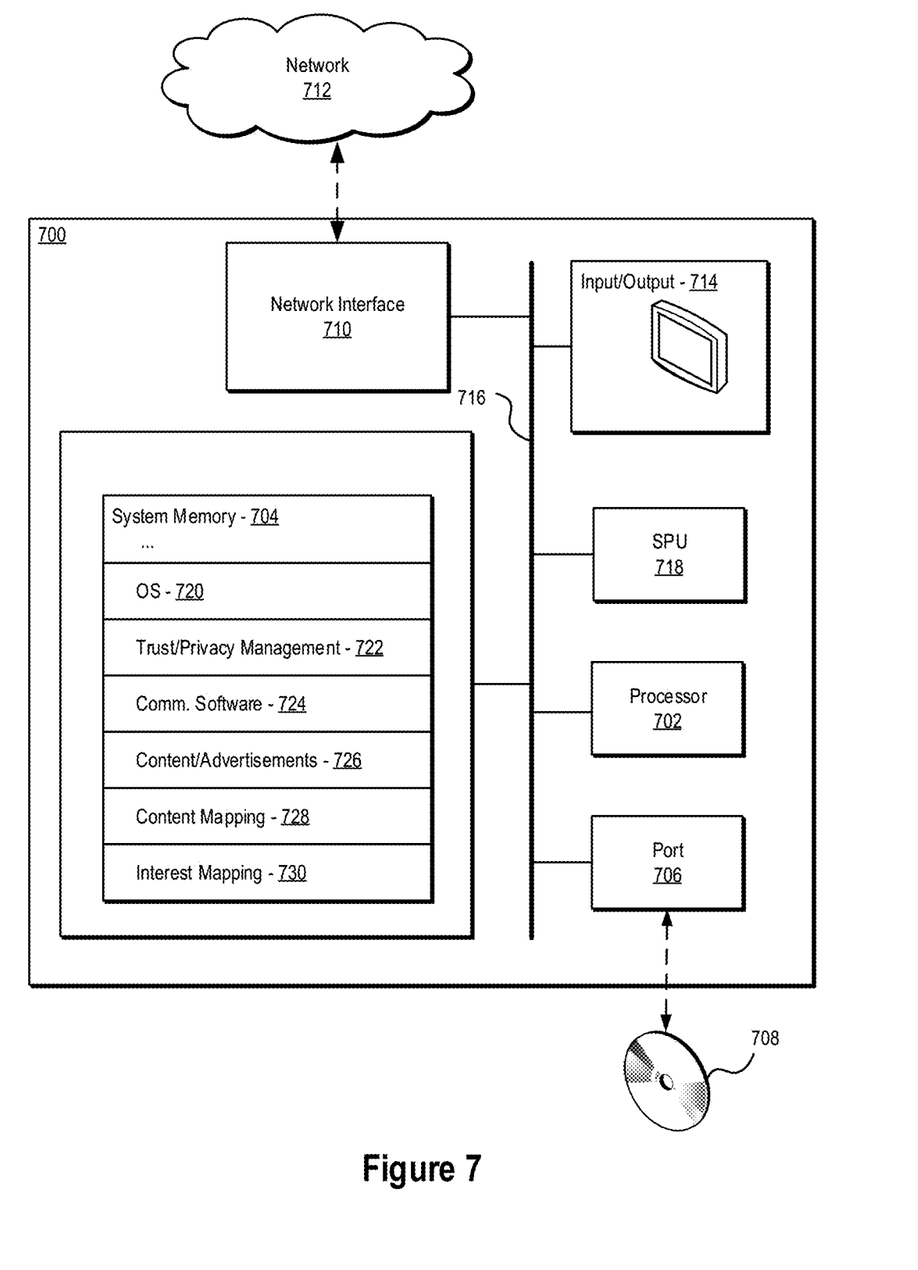
FIG. 7 illustrates a system that may be used to implement certain embodiments of the systems and methods of the present disclosure.

FIG. 7 illustrates a system 700 that may be used to implement certain embodiments of the systems and methods of the present disclosure. Various elements illustrated in the exemplary system 700 may be included in a system and/or device associated with a user, a content service, a content mapping service, and/or any other system configured to implement embodiments of the disclosed systems and methods. As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 704; a port 706 for interfacing with removable memory 708 that may include one or more diskettes, optical storage mediums (e.g., flash memory, thumb drives, USB dongles, compact discs, DVDs, etc.) and/or other non-transitory computer-readable storage mediums; a network interface 710 for communicating with other systems via one or more network connections 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system. In certain embodiments, the system 700 may include and/or be associated with one or more sensors (not shown) configured to collect various device data, including any of the types of sensors disclosed herein.

In some embodiments, the system 700 may, alternatively or in addition, include an SPU 718 that is protected from tampering by a user of the system 700 or other entities by utilizing secure physical and/or virtual security techniques. An SPU 718 can help enhance the security of sensitive operations such as personal information management, trusted credential and/or key management, privacy and policy management, and other aspects of the systems and methods disclosed herein. In certain embodiments, the SPU 718 may operate in a logically secure processing domain and be configured to protect and operate on secret and/or otherwise personal information, as described herein. In some embodiments, the SPU 718 may include internal memory storing executable instructions or programs configured to enable the SPU 718 to perform secure operations.

The operation of the system 700 may be generally controlled by the processing unit 702 and/or an SPU 718 operating by executing software instructions and programs stored in the system memory 704 (and/or other computer-readable media, such as removable memory). The system memory 704 may store a variety of executable programs or modules for controlling the operation of the system 700. For example, the system memory may include an operating system ("OS") 720 that may manage and coordinate, at least in part, system hardware resources and provide for common services for execution of various applications and a trust and privacy management system 722 for implementing trust and privacy management functionality including protection and/or management of personal data through management and/or enforcement of associated policies. The system memory 704 may further include, without limitation, communication software 724 configured to enable in part communication with and by the system 700, applications, content and/or advertisements 726, a content mapping module 728, an interest and/or segment identification module 730, and/or any other information, modules, and/or applications configured to implement embodiments of the systems and methods disclosed herein.

The systems and methods disclosed herein are not inherently related to any particular computer, service, device, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified with the scope and equivalents of the appended claims.

What is claimed is:

1. A method for facilitating rendering of one or more first content items in connection with a second content item on a user device performed by a content service system comprising a processor and a non-transitory computer-readable medium storing instructions that, when executed by the processor, cause the processor to perform the method, the method comprising:
    identifying a segment associated with a user of the user device, the segment comprising at least one of a user demographic and a user interest, the segment being determined based, at least in part, on user information received from the user device;
    determining that a content map of a stored plurality of content maps is associated with the identified segment, the content map comprising one or more specified content break locations for rendering content within other content;
    mapping the second content item in accordance with the content map associated with the identified segment;
    generating a content stream, the content stream comprising the one or more first content items presented within the second content item in accordance with the mapping of the second content item;
    transmitting the content stream to the user device;
    generating a first test content map and a second test content map;
    receiving first test response information corresponding to the first test content map from a first group of test user devices associated with the segment associated with the user of the user device;
    receiving second test response information corresponding to the second test content map from a second group of test user devices associated with the segment associated with the user of the user device;
    comparing the first test response information and the second test response information with at least one objective content mapping criteria; and
    generating the content map based, at least in part, on the comparison.

2. The method of claim 1, wherein identifying the segment associated with the user of the user device comprises:
    receiving, by the content service system, the user information from the user device;
    comparing the received user information with a database associating user information with a plurality of segments; and
    identifying the segment from the plurality of segments based on the comparison.

3. The method of claim 1, wherein identifying the segment associated with the user of the user device comprises receiving an indication from a service separate from the content service system of the segment associated with the user of the user device.

4. The method of claim 1, wherein the second content item comprises at least one of video content and audio content.

5. The method of claim 1, wherein the one or more first content items comprise at least one of video content, audio content, text content, and image content.

6. The method of claim 5, wherein the one or more first content items comprise at least one advertisement.

7. The method of claim 1, wherein the content map is further associated with the second content item.

8. The method of claim 7, wherein the one or more specified content break locations comprise one or more timestamp locations within the second content item.

9. The method of claim 8, wherein the content map comprises an indication of at least one of a break duration and an associated content type for each content break location of the one or more specified content break locations.

10. The method of claim 7, wherein mapping the second content item in accordance with the content map comprises mapping the second content item using the one or more timestamp locations.

11. The method of claim 10, wherein the content stream comprises the one or more first content items presented within the second content items at the one or more specified break locations within the second content item.

12. The method of claim 1, wherein comparing the first test response information and the second test response information with the at least one objective content mapping criteria comprises determining that the first test response information satisfies the at least one objective contentive mapping criteria more than the second test response information, and wherein generating the content map comprises generating the content map based on the first test response information.

13. The method of claim 1, wherein generating the first content map and the second test content map comprises analyzing the second content item to identify at least one video transition within the second content item.

14. The method of claim 1, wherein generating the first content map and the second test content map comprises analyzing the second content item to identify at least one audio transition within the second content item.

* * * * *